United States Patent Office 3,436,270
Patented Apr. 1, 1969

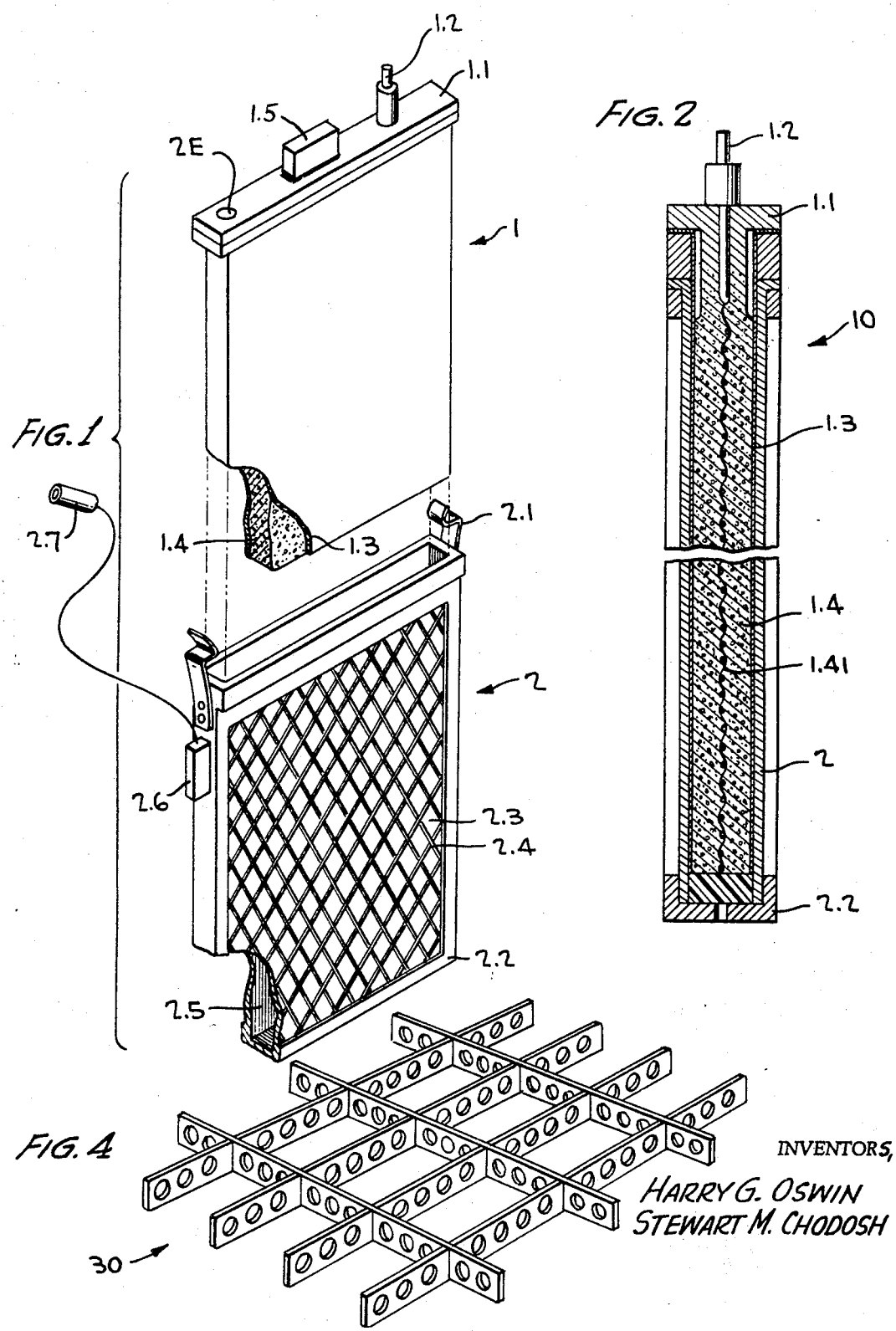

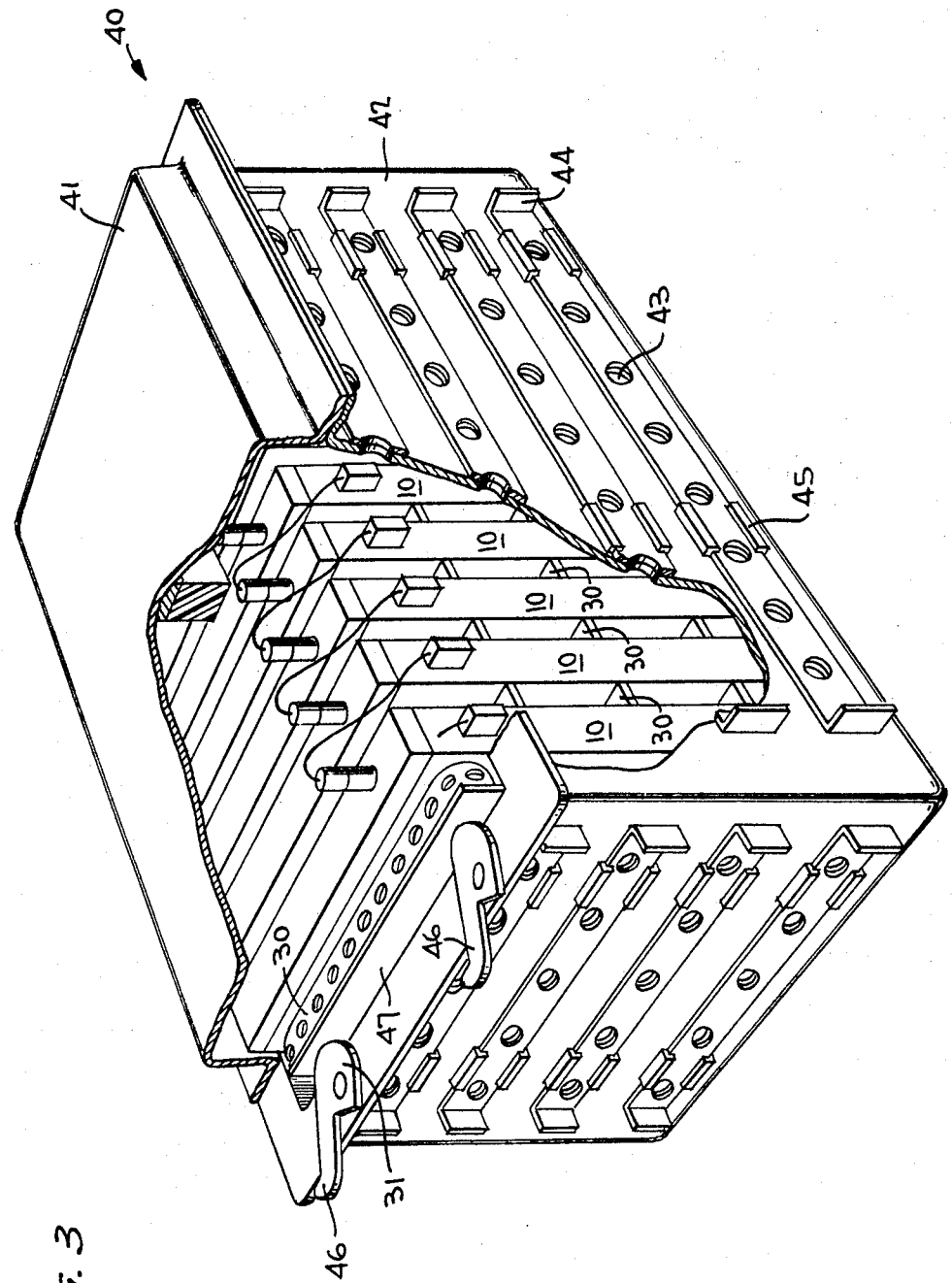

3,436,270
OXYGEN DEPOLARIZED CELL AND METHOD OF PRODUCING ELECTRICITY THEREWITH
Harry G. Oswin, Chauncey, and Stewart M. Chodosh, Lack Success, N.Y., assignors to Leesona Corporation, Warwick, R.I., a corporation of Massachusetts
Filed Dec. 30, 1965, Ser. No. 517,603
Int. Cl. H01m 27/06
U.S. Cl. 136—86                    20 Claims

ABSTRACT OF THE DISCLOSURE

An improved air or oxygen depolarized cell for the electrochemical generation of electrical energy is described. The cell utilizes an envelope cathode in which a removable, consumable metal anode is retained. Accordingly, the cell can be mechanically recharged by removing an expended anode and inserting a fresh anode. The anode comprises a top portion and a body portion with the top portion including means associated with the body portion for withdrawing electrical current from the cell.

---

This invention embraces an improved air or oxygen depolarized cell for the electrochemical generation of electrical current. More particularly, the invention is directed to the improved construction of an air or oxygen depolarized cell of the type described more completely in commonly assigned Oswin copending application, Ser. No. 427,623, filed Jan. 25, 1965, now abandoned. The invention herein is directed to the anode which can be readily removed and inserted permitting the convenient restoration of a cell once the metal anode has been consumed.

There are various designs for secondary batteries of the galvanic type which employ a metal to metal couple, such as the nickel/cadmium or silver/zinc batteries. These batteries are completely self-contained, that is, the components which take place in the electrochemical reaction are enclosed within the battery. When the battery is discharged by placing it under load and drawing off an electrical current, both the anode and cathode are effected and chemically changed in form. By reversing the polarity of the battery an applying an external potential, the cathode and anode theoretically can be returned to their original state, with the battery again being ready for further operation. In actual operation of the aforesaid cells, however, at least two problems are encountered:

(1) The cell is not completely regenerative, that is, the cell cannot be completely discharged and thereafter recharged, nor is it capable of being completely restored to its original state, with the battery becoming progressively shorter lived, and (2) Although it is possible to apply a quick charge, the battery still must be out of service for at least a minimal period.

Air or oxygen depolarized cells of the type where only the anode of the cell is chemically changed during operation are known in the prior art. These cells, while being particularly suitable for operations where only slow discharge is required, have not been practical where rapid discharge is necessary. Moreover, since the cathodes of the cell are carbon structures, recharging was impractical, if not impossible. More recently, however, the metal-oxygen or metal-air systems as described by Oswin in the aforesaid copending application, Ser. No. 427,623, have become increasingly attractive, particularly from the standpoint of obtaining a high energy to density ratio and rapid discharge and recharge. The ability to obtain the high discharge rates and recharging is primarily a result of the novel and highly efficient cathodes. In order to recharge such cells in situ, however, it is still necessary to have an available source of DC power. Particularly when the batteries are employed for propelling vehicles in the field, an external source of DC power is difficult, if not impossible, to obtain.

Accordingly, it is an object of the present invention to provide an air or oxygen depolarized cell having a replaceable anode, wherein the anodes can be conveniently and rapidly removed and inserted.

It is another object of the invention to provide an air or oxygen depolarized cell comprising a bi-cathode, a replaceable anode within said bi-cathode and a trapped electrolyte in a matrix around said replaceable anode and separating said anode from said bi-cathode.

These and other objects of the invention will be more readily apparent from the following detailed description, with particular emphasis being placed on the drawing.

The aforesaid objects of the invention are accomplished by constructing a metal-air or metal-oxygen depolarized cell which comprises a bi-cathode, referred to hereinafter at times as an envelope cathode, an anode and electrolyte between the anode and cathode, and means for retaining the anode and bi-cathode in operable association. The bi-cathode is made up of a hydrophobic polymer membrane such as polytetrafluoroethylene which is gas permeable, but impermeable to liquid, with a catalytic layer thereon which is in contact with the electrolyte of the cell. The anode, which comprises a layer of porous or solid metal, is positioned within the bi-cathode and separated therefrom by means of the electrolyte. Preferably the electrolyte is trapped in a suitable matrix such as a regenerated cellulose paper. Clamps are provided to hold the anode and cathode in operable association.

In operation, air or oxygen passes through the polymer membrane, ionizes at the catalytic layer, accepting electrons, and forming hydroxyl ions which are transferred to the anode to complete the electrochemical reaction. A representative reaction where zinc is employed as the anode and the cell is fed with oxygen is as follows:

At the cathode:

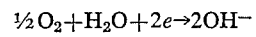

At the anode:

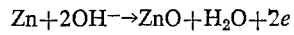

Total cell reaction:

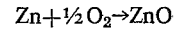

When the zinc anode is completely, or substantially completely, oxidized to the oxide, the anode is replaced by loosening clamping means on the battery, removing the anode and inserting a new anode. Since the cathode remains unchanged as a result of the electrochemical reaction, it does not require a separate recharging step. Preferably, new electrolyte will be furnished to the cell at the time the anode is replaced, for example, saturating a porous anode, and/or a hydrophilic membrane around the anode.

The improved construction of the cell of the present invention will be more readily apparent from the accompanying drawing, wherein like numerals are employed to designate like parts and wherein:

FIGURE 1 is an exploded perspective view of one embodiment of the improved cell with the anode and cathode being partly broken away;

FIGURE 2 is the cell of FIGURE 1 in cross section showing the anode and cathode in operable association;

FIGURE 3 demonstrates a battery of the metal-air or metal-oxygen cells with the housing partly broken away employing a cam design for holding he components of the cell stack in operable association and for permitting rapid replacement of the anodes; and FIGURE 4 is a perspective view of a preferred intercell spacer.

More specifically, referring to FIGURE 1 of the drawing which is an exploded view partly in section of the improved metal-oxygen or metal-air cell, reference numeral 10 is directed to the complete cell comprising anode 1 and bi-cathode 2. The bi-cathode comprises a frame 2.2, a hydrophobic membrane 2.3, a conductive support screen 2.4 which is on the internal side of the membrane, but in view of the thinness of the membrane the configuration of the screen is apparent from the outer surface of the membrane and a catalytic layer 2.5. The anode of the cell 1 fits into the bi-cathode 2 and comprises a top portion 1.1 and a porous sinter or sheet metal plate 1.4. In the embodiment shown in the drawing, the anode is held in place by clip 2.1. The anode can comprise a screen 1.41 to improve the strength and conductivity of the anode. Preferably a glassine paper or the like 1.3 completely covers the anode and electrically insulates the anode from the bi-cathode. If the anode is porous, sufficient electrolyte is added to the cell through port 2E to fill the pores and impregnate separator 1.3. In the event a sheet metal anode is selected, the electrolyte is added to the pocket of the bi-cathode and allowed to saturate separator 1.3 after the anode is in place, or the separator 1.3 is saturated with electrolyte prior to insertion of the anode. Element 1.5 can be utilized for gripping and removing the anode from the envelope cathode. Anode lead 1.2 is connected to an adjacent cathode lead 2.6 by means of socket 2.7.

FIGURE 3 is a diagrammatic view of a battery designated generally by reference numeral 40 composed of a plurality of metal-air or metal-oxygen cells of the type shown in FIGURES 1 and 2. The battery comprises a cover 41 and an outer casing 42 containing openings 43 which permit access of air to the internal part of the battery. Openings 43 can be closed when the battery is not in operation by slides 44 mounted in brackets 45. The individual cells 10 are separated from each other by inter-cell spacers 30. The inter-cell spacer as seen more clearly from FIGURE 4 is highly porous, permitting access of air between individual cells and to the bi-cathodes. An end plate 47 is at one end of the cell stack positioned away from the adjacent cell 10 by means of a spacer 30 having openings 31 to permit passage of air to the cathode. Cam means 46 hold the end plates, individual cells and inter-cell spacers in operable contact when in a closed position and permit convenient removal of the several components when loosened. As apparent, various modifications can be made to the actual design, and still fulfill the essential utility of the battery.

The bi-cathode as more fully described in the aforesaid copending Oswin application Ser. No. 427,623 comprises a hydrophobic polymer membrane which is in contact with a conductive metal support screen or mesh and a catalytic layer. The polymer which is to be used can be any polymeric material which is hydrophobic and permits the passage of gas, but precludes the flow of aqueous materials. Exemplary polymers are the fluorinated hydrocarbons such as polytetrafluoroethylene, polytrifluoroethylene, polyvinylfluoride, polyvinylidenefluoride, polytrifluoroethylene, the hydrophobic copolymers of two or more of the above materials or copolymers of such materials with acrylonitrile, methacrylate, polyethylene, and the like. The polymers normally will have a porosity of from about 15 to 85 percent and a uniform pore size distribution of from about 0.01 to about 100 microns, and a thickness of about 0.5 to 10 mils. The catalysts used to coat the hydrophobic polymers are the pure elements, alloys, oxides or mixtures thereof which are effective in promoting an electrochemical reaction. More specifically, operable materials include the elements, alloys, oxides, or mixtures of Groups I–B, II–B, IV, V, VI, VII and VIII metals of the Mendelyeev's Periodic Table. The metal support screen can be any material which conducts an electrical current and which will withstand the corrosive environment of the battery. Such materials include nickel, zirconium, titanium and tungsten screens, expanded meshes or the like. Moreover, it is possible to apply a hydrophilic polymer or other suitable hydrophilic material such as paper, over the catalytic layer which will be in contact with the electrolyte of the battery when in operation. Furthermore, in order to obtain a greater voltage from a given battery, it can be desirable to insert an insulating material in the bi-cathode to, in effect, provide two distinct cathodes. By connecting the cathodes of the cells in series, it is possible to obtain an increased voltage. Such cathodes as the term is used herein are still considered to be bi-cathodes. As will be apparent, if the cathode is separated by an insulating material, the anodes as well must be separated to form two distinct anodes, or one anode for each cathode.

The anodes which are to be used herein can be any conventional solid electro-conductor employed in a metal-oxygen cell such as metals, metalloids, alloys, and the heavy metal salts. It is only essential that the material selected be chemically reactive with a compatible electrolyte and be more electro-positive than oxygen. Such materials include lead, zinc, iron, cadmium, aluminum and magnesium. From the standpoint of cost, capacity, and convenience, zinc is the preferred material. Although the anode can be in the form of a solid, or substantially solid metal sheet it is preferred that the anode be porous. Porous anodes can be made, for example, by sintering select metal powders.

The cells will operate on conventional electrolytes including the alkaline materials such as sodium hydroxide, potassium hydroxide, mixtures of potassium and rubidium hydroxide and the like. Acid electrolytes including sulfuric acid, phosphoric acid and hydrochloric acid can be employed. As is apparent, depending upon the particular electrolyte used, different anode materials can be selected. It is also feasible, and at times desirable, to employ an electrolyte which is trapped in a suitable matrix such as those made up of hydrophilic polymers, ceramic materials, and the like.

Although the current take off is not shown in the drawings, the current take off can be any conventional plug accessable through the metal casing. A convenient means of taking off the current will be readily apparent to one skilled in the art.

It should be appreciated that the instant invention is not to be construed as being limited by the illustrative embodiments. It is possible to produce still other embodiments without departing from the inventive concept herein disclosed. Such embodiments are within the ability of one skilled in the art.

It is claimed:

1. An improved metal-air or metal-oxygen electrochemical cell containing a gas permeable envelope cathode comprising a hydrophobic polymer membrane and a conductive catalytic coating on the inner surface of said membrane, a replaceable metal anode positioned within said envelope cathode, an electrolyte in the space separating the cathode and anode, and means for retaining said anode in said envelope cathode and permitting its ready removal.

2. A plurality of cells as described in claim 1 in electrical connection wherein the means for retaining said envelope cathode, anode and electrolyte in operable association is the pressure applied to the end cells of said plurality cells.

3. The improved cell of claim 1 wherein the metal anode is porous.

4. The improved cell of claim 3 wherein the porous metal anode is zinc.

5. The improved cell of claim 3 wherein the porous metal anode includes a conductive support within the metal anode.

6. The improved cell of claim 5 wherein the conductive support is a metal screen.

7. The improved cell of claim 6 wherein the porous metal anode is zinc.

8. The improved cell of claim 7 wherein the zinc anode is wrapped in a membrane.

9. The improved cell of claim 8 wherein the membrane is glassine paper.

10. The improved cell of claim 8 wherein the porous zinc anode and membrane is saturated with electrolyte.

11. The improved cell of claim 1 wherein the electrolyte of the electrochemical cell is trapped in a matrix.

12. The improved cell of claim 11 wherein the electrolyte is a alkaline hydroxide.

13. The improved cell of claim 12 wherein the metal anode is zinc, the hydrophobic polymer membrane of the envelope cathode is polytetrafluoroethylene, the alkaline hydroxide electrolyte is potassium hydroxide, and the electrolyte matrix is paper.

14. The improved cell of claim 13 wherein the catalytic layer on the polytetrafluoroethylene membrane is an admixture of metal black and colloidal polytetrafluoroethylene.

15. The improved cell of claim 1 wherein the envelope cathode comprises a hydrophobic polymer membrane adjacent a conductive metal screen and the conductive catalytic coating is rolled into said screen.

16. The improved cell of claim 1 wherein the hydrophobic polymer membrane is polytetrafluoroethylene.

17. The improved cell of claim 16 wherein the catalytic layer on the polytetrafluoroethylene membrane is an admixture of metal black and polytetrafluoroethylene.

18. The improved cell of claim 1 wherein the catalytic layer is an admixture of metal black and colloidal polytetrafluoroethylene.

19. The method of generating electricity employing a metal/air or metal/oxygen electrochemical cell having a replaceable and consumable metal anode positioned within a gas permeable nonconsumable envelope cathode comprising a hydrophobic polymer membrane and a conductive catalyst layer on the inner surface of said membrane and an electrolyte separating said anode and cathode, said method comprising the steps of discharging said consumable metal anode by applying a load to said electrochemical cell, removing the discharged anode from said non-consumable envelope cathode and inserting a fresh or charged anode into said envelope cathode.

20. The method of claim 19, including the step of replenishing the electrolyte in the envelope cathode prior to inserting the fresh or charged anode into the envelope cathode.

References Cited

UNITED STATES PATENTS

| | | | |
|---|---|---|---|
| 668,838 | 2/1901 | Javison | 136—86 |
| 886,649 | 5/1908 | Schoenmehl | 136—169 |
| 942,704 | 12/1909 | Benko | 136—135 |
| 3,184,339 | 5/1965 | Ellis | 136—120 X |
| 3,328,202 | 6/1967 | Riffe | 136—120 X |

FOREIGN PATENTS 393,332  10/1908  France.

ALLEN B. CURTIS, *Primary Examiner.*

U.S. Cl. X.R.

136—120